United States Patent
Lin et al.

(10) Patent No.: US 11,229,251 B2
(45) Date of Patent: *Jan. 25, 2022

(54) WETTABLE SMS MATERIAL FOR PERSONAL PROTECTIVE EQUIPMENT APPLICATIONS

(71) Applicant: O&M Halyard, Inc., Mechanicsville, VA (US)

(72) Inventors: Brian E. Lin, Cumming, GA (US); Margaret A. Howell, Atlanta, GA (US)

(73) Assignee: O&M Halyard, Inc., Mechanicsville, VA (US)

( * ) Notice: Subject to any disclaimer, the term of this patent is extended or adjusted under 35 U.S.C. 154(b) by 509 days.

This patent is subject to a terminal disclaimer.

(21) Appl. No.: 16/104,629

(22) Filed: Aug. 17, 2018

(65) Prior Publication Data

US 2020/0054085 A1    Feb. 20, 2020

(51) Int. Cl.
| | | |
|---|---|---|
| *A41D 13/12* | (2006.01) | |
| *A41D 31/04* | (2019.01) | |
| *D04H 1/72* | (2012.01) | |
| *A41D 31/02* | (2019.01) | |
| *D06M 13/292* | (2006.01) | |

(Continued)

(52) U.S. Cl.
CPC ......... *A41D 31/04* (2019.02); *A41D 13/1218* (2013.01); *A41D 31/02* (2013.01); *B32B 5/022* (2013.01); *B32B 5/26* (2013.01); *D04H 1/4291* (2013.01); *D04H 1/4374* (2013.01); *D04H 1/72* (2013.01); *D06M 13/224* (2013.01); *D06M 13/248* (2013.01); *D06M 13/256* (2013.01); *D06M 13/292* (2013.01); *D06M 13/46* (2013.01); *A41D 2500/30* (2013.01); *A41D 2600/20* (2013.01); *B32B 2250/03* (2013.01); *B32B 2250/20* (2013.01); *B32B 2250/40* (2013.01); *B32B 2255/02* (2013.01); *B32B 2255/24* (2013.01); *B32B 2262/0253* (2013.01); *B32B 2307/72* (2013.01); *B32B 2307/724* (2013.01); *B32B 2307/726* (2013.01); *B32B 2437/04* (2013.01); *B32B 2535/00* (2013.01);

(Continued)

(58) Field of Classification Search
CPC .............. A41D 13/1218; A41D 31/125; A41D 13/1209; B32B 2437/04
See application file for complete search history.

(56) References Cited

U.S. PATENT DOCUMENTS

| | | |
|---|---|---|
| 2,666,925 A | 1/1954 | Mayer |
| 2,817,090 A | 12/1957 | Toellner |

(Continued)

FOREIGN PATENT DOCUMENTS

| | | |
|---|---|---|
| CN | 202697843 U | 1/2013 |
| CN | 205671558 U | 11/2016 |

(Continued)

*Primary Examiner* — Tajash D Patel
(74) *Attorney, Agent, or Firm* — Dority & Manning, P.A.

(57) ABSTRACT

A wettable SMS material for personal protective equipment, such as a SMS fabric that has been treated to improve the wettability and absorbency properties of the SMS fabric is provided. A treated SMS fabric for personal protective equipment can retain its durability, breathability, and comfort, and may also provide the fabric with wettability and absorption properties. An article for personal protective equipment formed from a wettable SMS fabric is also provided.

9 Claims, 6 Drawing Sheets

(51) Int. Cl.
  *D06M 13/248* (2006.01)
  *D06M 13/224* (2006.01)
  *B32B 5/02* (2006.01)
  *D04H 1/4291* (2012.01)
  *D04H 1/4374* (2012.01)
  *D06M 13/256* (2006.01)
  *D06M 13/46* (2006.01)
  *B32B 5/26* (2006.01)
  *D06M 101/18* (2006.01)

(52) U.S. Cl.
  CPC ... *D06M 2101/18* (2013.01); *D10B 2321/022* (2013.01); *D10B 2509/00* (2013.01)

(56) References Cited

U.S. PATENT DOCUMENTS

| | | | |
|---|---|---|---|
| 3,249,948 | A | 5/1966 | Eppolito |
| 4,041,203 | A | 8/1977 | Brock et al. |
| 4,491,985 | A | 1/1985 | Dalton |
| 5,159,720 | A | 11/1992 | Scott, Jr. |
| 5,161,260 | A | 11/1992 | Revnolds |
| 5,355,535 | A | 10/1994 | Bruder |
| 5,649,327 | A | 7/1997 | Crewe |
| 5,685,017 | A | 11/1997 | Kraft |
| 5,770,529 | A * | 6/1998 | Dennis ................... A41D 13/02 442/268 |
| 5,920,909 | A | 7/1999 | Ellsworth et al. |
| 6,021,525 | A | 2/2000 | Mertins |
| 6,163,886 | A | 12/2000 | Carter |
| 6,481,020 | B1 | 11/2002 | Kirkland |
| D539,011 | S | 3/2007 | Molesky |
| D591,485 | S | 5/2009 | Cho |
| 8,024,818 | B1 | 9/2011 | Davenport |
| 9,237,776 | B2 | 1/2016 | Kang |
| 9,439,466 | B2 | 9/2016 | Woo |
| 10,721,985 | B2 * | 7/2020 | Lin ..................... D06M 13/262 |
| 2005/0079379 | A1 * | 4/2005 | Wadsworth ............... B32B 3/26 428/684 |
| 2005/0144702 | A1 | 7/2005 | Whitney |
| 2006/0003154 | A1 | 1/2006 | Snowden et al. |
| 2006/0048277 | A1 | 3/2006 | Yeadon |
| 2006/0067962 | A1 * | 3/2006 | Krzysik ................. A61K 8/365 424/401 |
| 2006/0272073 | A1 | 12/2006 | Marquardt |
| 2007/0011796 | A1 * | 1/2007 | Manzo ................... A63B 71/12 2/310 |
| 2007/0163027 | A1 * | 7/2007 | Hamilton ................ A42C 5/04 2/171 |
| 2014/0026284 | A1 | 1/2014 | Yates |
| 2014/0299795 | A1 | 10/2014 | Cohen |
| 2014/0359918 | A1 | 12/2014 | Oates |
| 2018/0007989 | A1 | 1/2018 | Genender et al. |
| 2019/0030855 | A1 * | 1/2019 | Anantharamaiah ......... B32B 38/0012 |
| 2019/0075878 | A1 * | 3/2019 | Abraham ............... B32B 25/20 |

FOREIGN PATENT DOCUMENTS

| | | |
|---|---|---|
| CN | 206275198 U | 6/2017 |
| DE | 7931662 U1 | 2/1980 |
| DE | 102016103508 A1 | 10/2016 |
| GB | 353685 A | 7/1931 |
| JP | 2002242019 A | 8/2002 |
| JP | 3110940 U | 7/2005 |
| JP | 3125153 U | 9/2006 |
| JP | 2010126866 A | 6/2010 |
| JP | 3162955 U | 9/2010 |
| KR | 200366134 Y1 | 11/2004 |

\* cited by examiner

WETTABLE SMS MATERIAL FOR PERSONAL PROTECTIVE EQUIPMENT APPLICATIONS

BACKGROUND

Health care professionals often wear personal protective equipment (PPE), such as a surgeon's cap, a gown, gloves, shoe covers, as well as other wearable personal protective equipment to prevent contact with hazardous materials including blood or other bodily fluids. In addition, health care professionals are often required to wear some personal protective equipment, such as a head cover, gown, and gloves, for example, to cover all or parts of their person to protect the sterile environment. However, many articles of personal protective equipment include multiple layers of material which can trap heat and increase bulk.

Further, many personal protective equipment articles used during procedures are constructed of non-wettable materials. Particularly, materials such as spunbond or meltspun polyolefin materials, for example, spunbond-meltspun-spunbond laminates (SMS materials or SMS fabrics) lack breathability and wettability, and may result in sweating in various areas of the body due to stress, temperature, and/or personal predisposition to perspiration. Thus, such articles may cause unsanitary and uncomfortable situations during a surgery or procedure, as the material allows sweat to drip into the eyes and onto sterile surfaces, leading to higher risk for infection.

Consequently, there is a need for a material for personal protective equipment that overcomes the aforementioned shortcomings of existing materials used to form personal protective equipment. In particular, a material that meets the currents demands for durability and strength with improved breathability and/or wettability would be beneficial. Additionally, it would be advantageous to provide a wettable material suitable for personal protective equipment that is also able to dry after being wetted, and/or that is able to wick sweat away from the body of a user. It would also be a benefit to provide an article or articles for personal protective equipment that are at least partially formed from a wettable material suitable for personal protective equipment.

SUMMARY

The present disclosure is generally directed to a wettable spunbond-meltblown-spunbond (SMS) material for use in personal protective equipment, and includes a wettable spunbond-meltblown-spunbond laminate and a surfactant. The surfactant includes an anionic surfactant, a cationic surfactant, or combinations thereof. The wettable spunbond-meltblown-spunbond material is configured to dry after exposure to a liquid, and the wettable spunbond-meltblown-spunbond material is configured to absorb a liquid.

In an additional or alternative embodiment, the wettable spunbond-meltblown-spunbond (SMS) material is configured to absorb liquid from a surface. In a further embodiment, the surface is skin. Moreover, in a further embodiment, the wettable spunbond-meltblown-spunbond (SMS) material includes a polyolefin based polymer. In yet a further embodiment, the surfactant is applied to the polyolefin based polymer. Furthermore, in an embodiment, the polyolefin based polymer is hydrophobic prior to application of the surfactant to the polyolefin based polymer. Additionally or alternatively, the polyolefin based polymer includes a polypropylene and random co-polymer resin.

In yet a further embodiment, the wettable spunbond-meltblown-spunbond (SMS) material has a weight, and is capable of absorbing an amount of the liquid that is from about 1.5 times to about 4.5 times the weight of the wettable spunbond-meltblown-spunbond (SMS) material. Additionally or alternatively, the wettable spunbond-meltblown-spunbond (SMS) material forms all or a portion of a fabric, where the fabric has a basis weight of from about 10 grams per square meter (GSM) to about 60 GSM. Moreover, in an embodiment, the fabric has a permeability to air of from about 40 cubic feet per minute (CFM) to about 62 CFM.

The present disclosure also generally contemplates an article for use in personal protective equipment that includes a wettable spunbond-meltblown-spunbond (SMS) fabric. The wettable spunbond-meltblown-spunbond (SMS) fabric includes a spunbond-meltblown-spunbond laminate and a surfactant. The surfactant includes an anionic surfactant, a cationic surfactant, or combinations thereof, and at least a portion of the article is configured to be in contact with the skin of a user in a donned position.

Additionally or alternatively, the wettable spunbond-meltblown-spunbond (SMS) fabric has a weight, and is capable of absorbing an amount of liquid that is from about 1.5 times to about 4.5 times the weight of the wettable spunbond-meltblown-spunbond (SMS) fabric. In a further embodiment, the wettable spunbond-meltblown-spunbond (SMS) fabric is configured to absorb the liquid from the skin of a user. In yet a further embodiment, the spunbond-meltblown-spunbond laminate contains at least about three layers, and the surfactant is contained in or on at least two layers of the spunbond-meltblown-spunbond laminate.

In yet a further embodiment, the wettable spunbond-meltblown-spunbond (SMS) fabric exhibits a drying rate of from about 2.5 mL/hr to about 4 mL/hr. Moreover, in an embodiment, the wettable spunbond-meltblown-spunbond (SMS) fabric has a permeability to air of from about 40 CFM to about 62 CFM. Additionally or alternatively, the wettable spunbond-meltblown-spunbond (SMS) fabric is configured to absorb an amount of liquid of from about 1.25 grams to about 7.25 grams per gram of the wettable spunbond-meltblown-spunbond (SMS) fabric.

In yet a further embodiment, the article is a head cover, where at least a portion of the head cover includes the wettable spunbond-meltblown-spunbond (SMS) fabric, and where at least a portion of the head cover includes a spunbond fabric.

The present disclosure also generally contemplates a method of forming an article for use in personal protective equipment. The method includes saturating at least one side of a spunbond-meltblown-spunbond (SMS) fabric with a surfactant, where the surfactant is a cationic surfactant, anionic surfactant, or combinations thereof; drying the surfactant saturated spunbond-meltblown-spunbond (SMS) fabric; processing the surfactant saturated spunbond-meltblown-spunbond (SMS) fabric; and forming a wettable spunbond-meltblown-spunbond (SMS) fabric.

Additionally or alternatively, the processing step includes at least one antistatic treatment.

These and other features, aspects, and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1A:
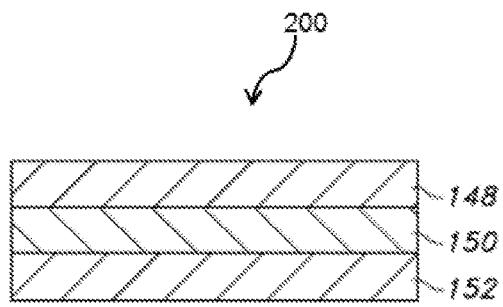
FIG. 1a is a view of a laminate according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally speaking, the present invention is directed to a SMS material, such as a SMS fabric that has been treated to improve the wettability and absorbency properties of the SMS fabric. As discussed above, SMS fabrics display desirable properties for the formation of personal protective equipment (PPE); however, SMS fabrics are generally hydrophobic and water repellent. This may cause disruptive and/or unsanitary conditions during procedures, as sweat may drip down the face or head of a clinician, potentially distracting the clinician and placing the surgical site or procedure site at a higher risk for infection. Therefore, it would be beneficial to utilize a SMS fabric for its desirable breathability and lightweight qualities, but where the SMS fabric is also capable of absorbing liquids. Thus, the present inventors have found that by treating a SMS fabric with a surfactant, a wettable SMS fabric may be formed that retains the desirable qualities of the SMS fabric, including durability, but may also exhibit good liquid absorbency and drying properties. For instance, a surfactant selected according to the present disclosure may allow the wettable SMS fabric to retain its durability, breathability, and comfort, and may also provide the fabric with wettability and absorption properties in addition to aiding in reducing the surface tension of liquids that contact the SMS fabric.

Particularly, SMS fabric may be formed from a laminate of a spunbond-meltblown-spunbond material made from three separate layers. The separate layers may then be laminated to one another. Particularly, the number of layers, the materials used to form a SMS material, and the lamination, provides a durable fabric that is capable of providing sufficient structure to support a headlamp or any other accessories that might be worn about the crown of the head by a health care professional. The method of making the aforementioned materials is known and described in U.S. Pat. No. 4,041,203 to Brock, et al., which is incorporated herein in its entirety by reference. The material of Brock, et al. is a three layer laminate of spunbond-meltblown-spunbond layers that is also commonly referred to by the acronym "SMS." The two outer layers (e.g., the innermost and outermost layer) of SMS are a spunbond material made from extruded polyolefin fibers, or filaments, laid down in a random pattern and then bonded to one another. The inner layer (or the middle layer located between the two outer spunbond layers) is a meltblown layer also made from extruded polyolefin fibers generally of a smaller diameter than the fibers in the spunbond layers.

As a result, the meltblown layer provides increased barrier properties due to its fine fiber structure, which permits the sterilizing agent to pass through the fabric while preventing passage of bacteria and other contaminants. Conversely, the two outer spunbond layers provide a greater portion of the strength factor in the overall laminate. The laminate may be prepared using an intermittent bond pattern that is preferably employed with the pattern being substantially regularly repeating over the surface of the laminate. The pattern is selected such that the bonds may occupy about 5% to about 50% of the surface area of the laminate. Desirably, the bonds may occupy about 10% to about 30% of the surface area of the laminate.

The fibers in the nonwoven materials themselves can be made from a variety of both natural and synthetic materials including, but not limited to, rayon, nylon, polyesters, polyolefins, and many other materials. Particularly, in one embodiment, the SMS fabric may be formed from polyolefin based polymers, and in one embodiment, the polyolefin based polymer and/or the SMS fabric includes a polypropylene and random co-polymer (RCP) resin(s). The fibers may be relatively short, staple length fibers, typically less than three inches, or longer and substantially more continuous fibers such as are produced by spunbonding and melt-blowing processes.

For example, FIG. 1a illustrates a SMS laminate 200 according to an embodiment of the present disclosure. The SMS laminate 200 includes a first spunbond layer 148, a meltblown layer 150, and a second spunbond layer 152. In one embodiment, the first spunbond layer 148 and the second spunbond layer 152 may be formed from the same or similar polymer composition, such as one of the polymer compositions discussed above. In an additional or alternative embodiment, the first spunbond layer 148 and the second spunbond layer 152 may be formed from different polymer compositions, or may contain one or more additives in the composition that differ as between the first spunbond layer 148 and the second spunbond layer 152. Additionally, while the first spunbond layer 148 is described as the "first layer", first spunbond layer 148 may serve as the inner or outer surface of the laminate. Similarly, the second layer 152, while described as the second layer, may also serve as either the inner or outer surface of the laminate.

Regardless of the form or composition of the SMS laminate 200 used, a SMS laminate 200 according to the present disclosure may have a surfactant introduced thereto. In one embodiment, the surfactant may be a cationic or anionic surfactant. Regardless of the type of surfactant chosen, it may be desirable to select a surfactant that is compatible with antistatic treatments used for nonwoven fabrics. Particularly, notwithstanding the surfactant selected, the surfactant may be sprayed on one or both sides of the SMS fabric, such as by applying an amount of surfactant such that the SMS fabric is saturated. At such a time, the SMS fabric saturated with a surfactant is put through standard processing for a SMS fabric, including running the saturated fabric through rolls and dryers to remove the liquid, leaving the surfactant impregnated on or in the fabric. For instance, a SMS fabric impregnated with a surfactant according to the present disclosure may have surfactant on one or both sides of the fabric, and/or coating the fibers forming the fabric through all three layers, or a portion of fibers from each of the three layers, or only coating the fibers of one or more layers of a fabric formed from a SMS laminate 200 according to the present disclosure. Therefore, as the surfactant is to undergo processing along with the SMS fabric after incorporation, it would be desirable to select a surfactant that is compatible with processes for producing SMS fabrics, such as antistatic treatments.

Thus, in one embodiment, the surfactant may include one or more anionic surfactants, cationic surfactants, or a combination thereof. Anionic surfactants may include mono and dialkyl sulfosuccinates, alkyl sulfates, sulfonates such as alkyl, aryl, benzene, alkyl ether, and olefin sulfonates, alkyl ether sulfates, alcohol and alcohol ether sulfates, phosphates such as alkyl phosphates and phosphate ethers, alkyl and alkyl ether carboxylates, fatty carboxylates, alkyl and ethoxylated alkyl phosphate esters, taurates, and a combination thereof. In one embodiment, a cationic surfactant, used alone or in combination, may be a dialkyl sulfosuccinate or salt thereof, such as a dialkyl sulfosuccinate sold under the trade name DOSS-70D.

Surfactants according to the present disclosure may also include cationic surfactants such as quaternary ammonium compounds, fatty alcohol ethoxylates, alkylene glycol surfactants, or a combination thereof.

Additionally, the surfactant(s) may be applied as part of a surfactant composition that includes a carrier or solvent. In one embodiment, the carrier or solvent may be water, or alternatively, may be another carrier or solvent as generally known in the art which is compatible with a SMS fabric according to the present disclosure. Additionally, while not necessary, in some embodiments, the surfactant composition may also include various additives as known in the art, such as an antifoaming additive, for example, to minimize foaming of the surfactant when added to the carrier or solvent.

Particularly, as may be generally known in the art, a surfactant is used to reduce the surface tension of a liquid, increasing the liquid's spreading and wetting properties. The present inventors have found that when a surfactant composition is applied to a SMS fabric in an amount sufficient to saturate the fabric, for example, and then dried, the fabric may display wetting and absorbency properties, even when the base fabric is hydrophobic or has hydrophobic properties prior to application of the surfactant. For instance, surfactants are polar molecules that have a hydrophilic end and a hydrophobic end. When introduced to a SMS laminate or fabric according to the present disclosure, the hydrophobic ends may orient themselves on the fibers of the SMS fabric or laminate, coating all or a portion of the fibers of the SMS fabric or laminate, leaving the hydrophilic ends available to receive fluid coming into contact with the fabric. The hydrophilic ends may also reduce the surface tension of the fluid coming into contact with the fabric by overcoming the adhesion of the fluid to itself (e.g., surface tension), causing a spreading out of droplets and dispersion of the fluid over the surface of the fabric.

Figure 1B:
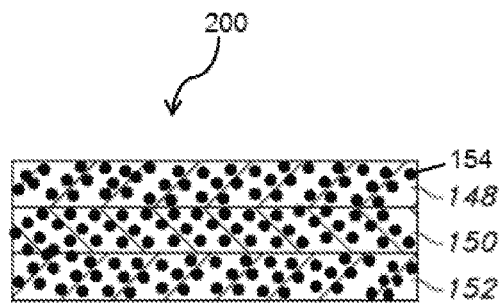
FIG. 1b is a view of the laminate of FIG. 11a including a surfactant according to the present disclosure.

For instance, when an SMS fabric or laminate has been saturated with a surfactant, and then dried, the carrier or solvent may be evaporated while the surfactant is retained on the fabric or laminate, coating the fibers of the SMS fabric or laminate with the surfactant as discussed above. For example, referring to FIG. 1b, a SMS laminate 200, which as discussed above may form all or a portion of a wettable SMS fabric according to the present disclosure, having a first spunbond layer 148, a meltblown layer 150, and a second spunbond layer 152, further includes a surfactant 154. The surfactant 154 has coated the SMS laminate 200 (such as coating the fibers thereof in one embodiment), and was applied in a manner sufficient to coat all three layers of SMS laminate 200. In such an embodiment, the fibers from all or a portion of each of the layers may be coated with a surfactant, such that a continuous path of coated fibers (e.g., a coated fiber or section of fibers from one layer is adjacent to, or in contact with, a coated fiber or section of fibers in an adjacent layer) is formed between the first spunbond layer 148, meltblown layer 150, and second spunbond layer 152, as may be shown in FIG. 1b. However, while FIG. 1b shows a SMS laminate 200 that has continuous paths of coated fibers throughout the entire laminate 200, which as discussed above, may be a fiber or portion of fibers in adjacent layers that form a continuous path of coated fibers from the first spunbond layer 148 to the meltblown layer 150 to the second spunbond layer 152, or vice-a-versa, in one embodiment, a SMS fabric according to the present disclosure may only have portion of the fabric that has continuous coated fiber portions, and the other portion(s) may only be partially coated, or may be uncoated. As such, after drying, the surfactant may be present on or in the SMS fabric in an amount of from about 0.1 wt. % to about 20 wt. %, such as from about 0.5 wt. % to about 18 wt. %, such as from about 1 wt. % to about 15 wt. % based upon the weight of the wettable SMS fabric.

Regardless of the surfactant or combination of surfactants selected, and/or the materials used to form the wettable SMS fabric, the present inventors have unexpectedly found that the wettable SMS fabric, after treatment with the surfactant, displayed excellent absorbency properties. For instance, in one embodiment, the wettable SMS fabric according to the present disclosure may be capable of absorbing an amount of a liquid that is from about 1.5 times to about 4.5 times the weight of the weight of the SMS fabric, such as from about 2 times to about 4 times the weight of the SMS fabric, such as from about 3 times to about 3.9 times the weight of the SMS fabric based on the total weight of the SMS fabric. Additionally, a wettable SMS fabric according to the present disclosure may have a high absorbent capacity in grams per gram of the wettable SMS fabric. For instance, the wettable SMS fabric may absorb from about 1.25 grams to about 7.25 grams per gram of SMS fabric, such as from about 2.75 grams to about 6.5 grams per gram of SMS fabric, such as from about 3.5 grams to about 5 grams of a liquid per gram of SMS fabric. Additionally, the wettable SMS fabric may be capable of absorbing the amount of liquid up to its absorbent capacity in grams, at a rate of from about 1 second to about 9 seconds, such as from about 3 seconds to about 7 seconds, such as from about 3 seconds to about 6 seconds.

In such embodiments, the wettable SMS fabric may have a fabric weight in grams per square meter (gsm) of from about 10 gsm to about 60 gsm, such as from about 15 gsm to about 55 gsm, such as from about 20 gsm to about 50 gsm, such as from about 25 gsm to about 45 gsm, such as from about 30 gsm to about 40 gsm.

Additionally, the wettable SMS may display good wicking properties, such that absorbed liquid may be evaporated or dried off of the fabric, to move moisture away from the body. Particularly, the wettable SMS fabric of the present disclosure are sufficiently porous and wettable to exhibit capillary action, particularly a capillary action and/or drying rate higher than that of some cellulose based fabrics, showing that the wettable SMS fabric is able to wick moisture away from a surface and dry after absorbing a liquid. For instance, a wettable SMS fabric according to the present disclosure (tested using AATCC 201, at 37° C., using 0.2 mL of water) may have a drying rate of from about 2.5 milliliters per hour (mL/hr) to about 4 mL/hr, such as from about 2.75 mL/hr to about 3.75 mL/hr, such as from about 3 mL/hr to about 3.5 mL/hr.

Moreover, a wettable SMS fabric according to the present disclosure also displays excellent breathability, as indicated by having a high permeability to air passage. For instance, in one embodiment, the SMS fabric according to the present disclosure (tested according to ASTM D737-18 using a 4 inch×4 inch (10 cm×10 cm) sample) may have a permeability to air, measured in the cubic feet per minute of air that passes through the SMS fabric, of from about 40 CFM to about 62 CFM, such as from about 42 CFM to about 60 CFM, such as from about 44 CFM to about 58 CFM, such as from about 46 CFM to about 56 CFM, such as from about 48 CFM to about 54 CFM. Additionally, as the wettable SMS fabrics of the present disclosure are constructed of polyolefin-based compositions, the wettable SMS fabrics of the present disclosure display low linting properties even after 1 year and 5 year accelerated aging, and particularly as compared to cellulose based fabric.

Furthermore, certain embodiments of the present disclosure may be better understood according to the following examples, which are intended to be non-limiting and exemplary in nature.

Particularly, wettable SMS fabrics according to the present disclosure were tested for their absorbent capacity (and percent absorption) and absorption rate, results of which are shown in Table 1. Absorption rate was measured according to TAPPI T 432 using 4 inch×4 inch (10 cm×10 cm) samples, and is an average of 90 samples tested. The absorbent capacity and percent absorption were tested using 90 samples of a SMS fabric with a basis weight of 34 gsm and a sample size of 4 inch×4 inch (10 cm×10 cm). The wettable SMS fabric samples were produced from three different lots to account for lot variability.

TABLE 1

| Absorbent Capacity (grams) | Average | 1.39 |
|---|---|---|
| Percent Absorption (%) | Average | 376.6 |
| Absorption Rate (seconds) | Average | 4.35 |

Particularly, it was found that, on average, the wettable SMS fabric had an absorbent capacity in grams of 1.39 grams, or an absorbent capacity (measured as percent absorption) of 376.6% or roughly an absorption capacity for the liquid of about 3.75 times the weight of the fabric. Additionally, Table 1 shows an absorption rate in seconds of 4.35 seconds of an amount of liquid up to the samples absorbent capacity, showing that the wettable SMS fabric was able to quickly absorb the liquid.

In Table 2, the drying rate of three wettable SMS samples according to the present disclosure (SMS 1, SMS 2, SMS 3) were tested using the AATCC 201, using 15 cm×15 cm samples and 0.2 mL of water, at 37° C. and air flow over the sample of 1.25 m/s, against a more traditional cellulose based fabric.

TABLE 2

| Sample | Drying Rate (mL/hr) |
|---|---|
| SMS 1 | 3.2 |
| SMS 2 | 3.15 |
| SMS 3 | 3.3 |
| Average | 3.22 |
| Cellulose based 1 | 1.64 |
| Cellulose based 2 | 1.66 |
| Cellulose based 3 | 1.7 |
| Average | 1.67 |

As shown in Table 2, the SMS samples had an average drying rate of 3.22 mL/hr as compared to an average of 1.67 mL/hr for the cellulose based samples. Therefore, the SMS samples dried almost twice as fast as the cellulose based samples in drying a liquid after it had been absorbed. Thus, a SMS fabric according to the present disclosure may be able to wick sweat away from the body of a user, more quickly than a cellulose based fabric. Additionally, Tables 1 and 2 show the ability of the SMS fabric to absorb a liquid from a surface, (e.g., which may be sweat from a user in one embodiment) and then also dry after absorption of the liquid.

Table 3 shows data resulting from the testing of a total 90 samples split between wettable SMS fabric samples according to the present disclosure and a spunbond fabric for breathability. For instance, the spunbond fabric may be a spunbond a fabric discussed above formed from a polyolefin, and which may be used in a personal protective equipment article in conjunction with the SMS fabric according to the present disclosure. Particularly, as will be discussed in greater detail below, spunbond fabrics may be used to form portions of an article where high breathability is needed, but high support is not, for instance on the top of a head cover where instrument support is not needed. Thus, a spunbond fabric may be used alongside an SMS fabric according to the present disclosure to form a breathable and light PPE garment. As will be discussed in greater detail, an article according to the present disclosure may be formed solely from the SMS fabric, or may have portions, such as the crown and sides formed from the SMS fabric and other portions, such as the top, formed from a spunbond fabric.

Thus, the samples were tested according to ASTM Test D737-18 using 10 cm×10 cm (4 inch×4 inch) samples for air permeability. In such a test, higher values indicate higher permeability to air passage. Particularly, the results are provided in the units cubic feet per minute (CFM), and the results reflect a velocity at which air flows out or through a medium. Thus, a higher value in CFM indicates a material that is more permeable to air, as a greater velocity in CFM passes through the medium.

TABLE 3

|  |  | Trial 1 | Trial 2 | Trial 3 |
|---|---|---|---|---|
| Wettable SMS | Average (CFM) | 52.6 | 51.23 | 50.33 |
|  | Standard Deviation | 2.61 | 2.61 | 2.25 |
| Spunbond | Average (CFM) | 148.33 | 1315.7 | 1333.73 |
|  | Standard Deviation | 28.54 | 69.21 | 135.15 |

Thus, it can be concluded from Table 3, that both fabrics used in a head cover 100 according to the present disclosure demonstrate air permeability and breathability.

Therefore, the present disclosure has found that a wettable SMS fabric may display properties that make it an ideal fabric for use in personal protection equipment.

As the present disclosure has found that a SMS fabric, such as the SMS fabric described above, may be treated to impart absorbency, wettability, wicking, as well as maintaining the known benefits of SMS fabrics, a SMS fabric according to the present disclosure may be used in many applications in which sweating or the wicking of sweat is desired. For instance, the wettable SMS fabric may be used to form all of a portion of a variety of personal protective equipment such as gowns, head covers, facemasks, and other wearable applications particularly in the field of personal protective equipment. Additionally or alternatively, the SMS fabric may only be used to form a portion, or a layer (or layers) of an article for use as personal protective equipment. In such an embodiment, the SMS fabric may be used to form an inner layer or layers of such an article, while an outer layer or layers may be a fabric that is impervious to materials such as blood and other bodily fluids, for instance, barrier fabrics as may be known in the art.

For instance, one embodiment, the article for use as personal protective equipment may include using a wettable SMS fabric according to the present disclosure to form all or a portion of a head cover. While the following describes a specific head cover for use with the wettable SMS fabric, it should be understood that the wettable SMS fabric may be used to form any head cover or wearable personal protective garment where liquid absorbency or wicking is desired. However, reference to FIGS. 2-11 will provide one example of a head cover that may be used in combination with the disclosed wettable SMS fabric.

Figure 2:
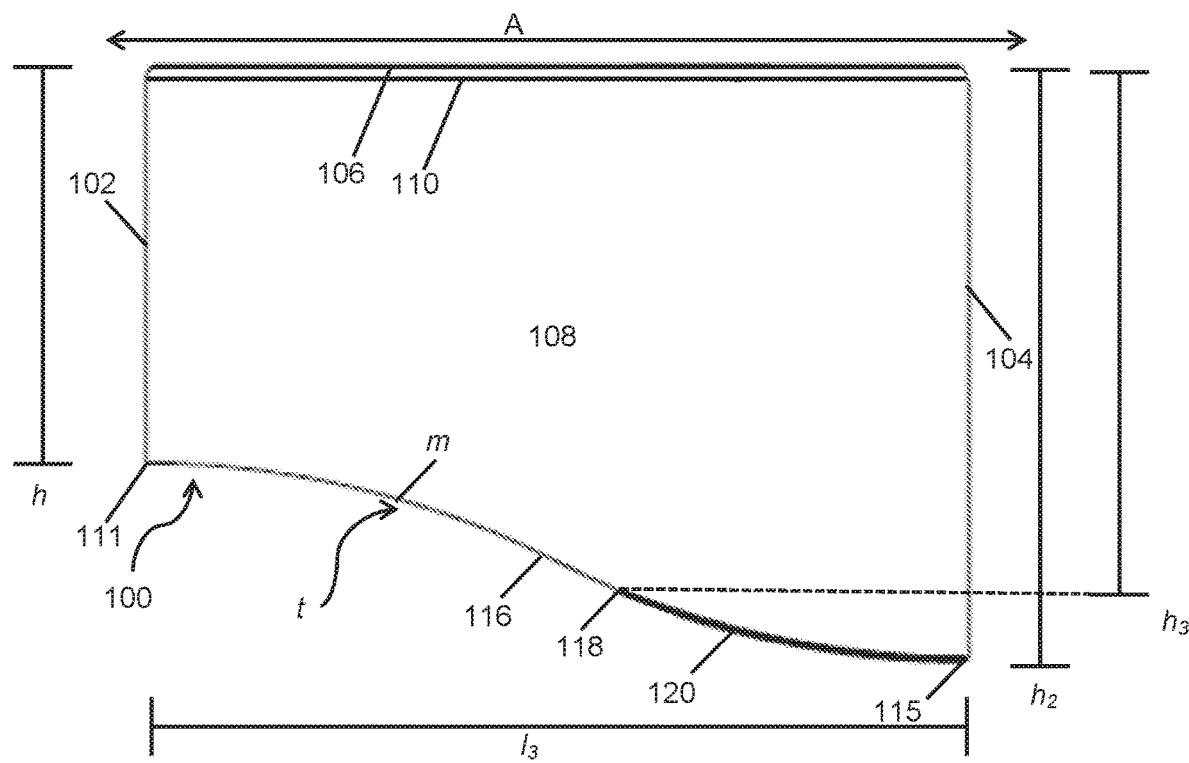
FIG. 2 is a side view of an embodiment of a head cover according to the present disclosure.

Referring now to FIG. 2, one embodiment of a head cover 100 contemplated by the present disclosure is shown before the head cover 100 has been donned and secured about the head of a wearer. The head cover 100 according to the present disclosure may be formed entirely or in part from a wettable SMS fabric as described above, and may have an anterior portion 102 that is positioned about a forehead of a wearer and a posterior portion 104 that can be secured about the back of the head or neck of the wearer. The head cover 100 also includes a top surface 106 and a side portion 108. In one embodiment, the top surface 106 and the side portion 108 (or side panel 126, which will be described in greater detail below) can be joined together at a seam 110 that encircles the circumference (shown more clearly in FIG. 4) of the top surface 106. The side portion 108 extends between a first end 112 located adjacent to the anterior portion 102 and a second end 114 adjacent to a posterior portion 104. Of course, it should be noted, as shown in FIGS. 8-11, that the side portion 108 may be formed of a continuous piece of material, such as a side panel 126 that wraps around a head of a user.

In one particular embodiment, the top surface 106 of the head cover 100 can be formed from a spunbond material to facilitate air flow and minimize the amount of heat trapped within the head cover 100. Meanwhile, the side portion(s) 108 or the side panel 126 can be formed from the wettable SMS material of the present disclosure in order to provide sufficient structure to support a headlamp or any other accessories that might be worn about the crown of the head by a health care professional in addition to providing absorbency and breathability in areas that tend to sweat or accumulate moisture.

Further, although the head cover 100 is described above as being formed from a combination of spunbond and SMS materials, is to be understood that the different portions of the head cover 100 can be made from any other suitable materials that minimize the trapping of heat yet provide sufficient structure as needed. For instance, in addition to the spunbond or SMS materials described above, any or all of the portions of the head cover 100 can be formed from a woven cotton material.

Additionally, in an embodiment of the present disclosure, the head cover 100 may have a height h at an anterior portion 102 of the head cover 100 that is less than a height $h_2$ at a posterior portion 104 of the head cover 100. For instance, in one embodiment, a height h may be a height sufficient to cover a forehead of a user without obscuring the eyes or eyebrows of a user, or infringing upon the user's vision or line of sight. In such an embodiment, the height h at an anterior portion 102 of the head cover 100 may be from about 7 cm to about 17 cm, such as from about 8 cm to about 16 cm, such as from about 9 cm to about 15 cm, such as from about 10 cm to about 14 cm.

Furthermore, in an embodiment according to the present disclosure, the height $h_2$ at a posterior portion 104 of the head cover 100 may have a height that is greater than a height h at an anterior portion 102 of the head cover 100. For instance, in one embodiment, the height $h_2$ at a posterior portion 104 of the head cover 100, may be sufficient to cover the back of a user's neck, such as to at least partially, if not fully, cover the nape of the user's neck. In such an embodiment, the height $h_2$ at a posterior portion 104 of the head cover 100 may be from about 11 cm to about 23 cm, such as from about 12 cm to about 22 cm, such as from about 13 cm to about 21 cm, such as from about 14.5 cm to about 20 cm. It should be noted, that in one embodiment, the posterior portion 104 of the head cover 100 can fully cover the nape of a user's neck to provide sufficient neck coverage as required by AORN standards.

In one embodiment, a height $h_2$ at a posterior portion 104 of the head cover 100 may have a height of from about 1.1 to about 3.3 times the height hat an anterior portion 102, such as from about 1.2 to about 2.9 times the height h at an anterior portion 102, such as from about 1.3 to about 2.35 times the height h at an anterior portion 102, such as from about 1.3 to about 2 times the height h at an anterior portion 102. Thus, the opposite is also true. Particularly, if instead, a height $h_2$ at a posterior portion 104 is known, the height $h_2$ may be divided by the above multipliers to arrive at a height h of an anterior portion 102 of the head cover 100.

Continuing to discuss FIG. 2, a head cover 100 according to the present disclosure can have a side portion 108 that may be a portion of a continuous side panel 126, that extends from an anterior portion 102 of the head cover 100 to a posterior portion 104 of the head cover 100. The side portion 108 may have a contoured portion t defining the bottom edge 116 of the side portion 108. However, it should be noted that, in an embodiment where the side portion 108 is a portion of a continuous side panel 126 that completely encircles a head of user, the contoured portion t may define a bottom edge 116 of only the side portion 108, such as a portion extending between an anterior portion bottom edge 112 and a posterior portion bottom edge 114 of the side portion 108, such that anterior portion 102 and posterior portion 104 may each have their own respective bottom edges (112 and 114) that are not defined by contour portion t. In such an embodiment, it may be noted that the anterior portion bottom edge 112, and the posterior portion bottom edge 114 may be delineated and/or marked, such as by a seam or other marker (as shown more clearly in FIGS. 6, 7, 10, and 11) indicating the transition from a side portion 108 to an anterior 102 or posterior portion 104, or may simply be a point on the side panel 126 with no delineation (as shown more clearly in FIGS. 8 and 10), such as a point where the height (h or $h_2$) is no longer increasing or decreasing along the contoured portion t, and/or where the bottom edge 116 has no or negligible slope (as may be shown and described more clearly in regards to FIGS. 8, 9, and 11). Particularly, while the anterior portion bottom edge 112 and/or posterior portion bottom edge 114 may have some slope between their respective first and second ends, (111,113; 115,117 respectively), in one embodiment, the anterior portion bottom edge 112 and posterior portion bottom edge 114 are substantially horizontal or have no or negligible slope.

Additionally, in one embodiment, the anterior portion bottom edge 112 extends between a first end 111 of the anterior portion bottom edge 112 and a second end 113 of the anterior portion bottom edge 112, and the posterior portion bottom edge 114 extends between a first end 115 of the posterior portion bottom edge 114 and a second end 117 of the posterior portion bottom edge 114. Thus, in one embodiment, the bottom edge 116 of the side portion 108 may extend between a first end 111 of the anterior portion bottom edge 112 and the first end 115 of the posterior portion bottom edge 104, and/or the bottom edge 116 of the side portion 108 may extend between the second end 113 of the anterior portion bottom edge 112 and the second end 117 of the posterior portion bottom edge 114.

Regardless, the contoured portion t may define a bottom edge 116 of the side portion 108 that increases the height of the side portion 108 of the head cover 100 when moving from an anterior portion 102 to a posterior portion 104, and decreases a height of the side portion 108 when moving from a posterior portion 104 to an anterior portion 102. Particularly, the bottom edge 116 of the side portion 108 connects an anterior portion bottom edge 112 and a posterior portion bottom edge 114, using a bottom edge 116 of the side portion 108 that is not horizontal and/or that has at least some positive slope when moving along the bottom edge 116 from a posterior portion 104 to an anterior portion 102 or at least some negative slope when moving along the bottom edge 116 from an anterior portion 102 to a posterior portion 104, in order to connect the of the anterior portion bottom edge 112, which has a smaller height h, to a posterior portion bottom edge 114 which has a larger height $h_2$, in a smooth, continuous, but not necessarily linear, manner. For instance, the bottom edge 116 of the side portion may connect the anterior portion 102 and posterior portion 104, in one embodiment, by extending between a first end 111 of the anterior portion bottom edge 112 and a first portion 115 of the posterior portion bottom edge 114, and/or the bottom edge 116

In one embodiment, the bottom edge 116 may display a change in height in a linear or nonlinear manner. For instance, in the embodiments of FIGS. 8 and 9, the change in height of the head cover 100 along bottom edge 116 may be roughly linear. Alternatively, such as an embodiment shown in FIG. 2, the bottom edge 116 may exhibit a change in height in a nonlinear manner and have at least one change in average slope, such as at least two changes in average slope, such as at least three changes in average slope, where the average slope of the nonlinear bottom edge 116 may be measured between a starting point and an inflection point, and an inflection point and an end point, or simply at a starting and ending point and one or more predetermined points therebetween.

Figure 8:
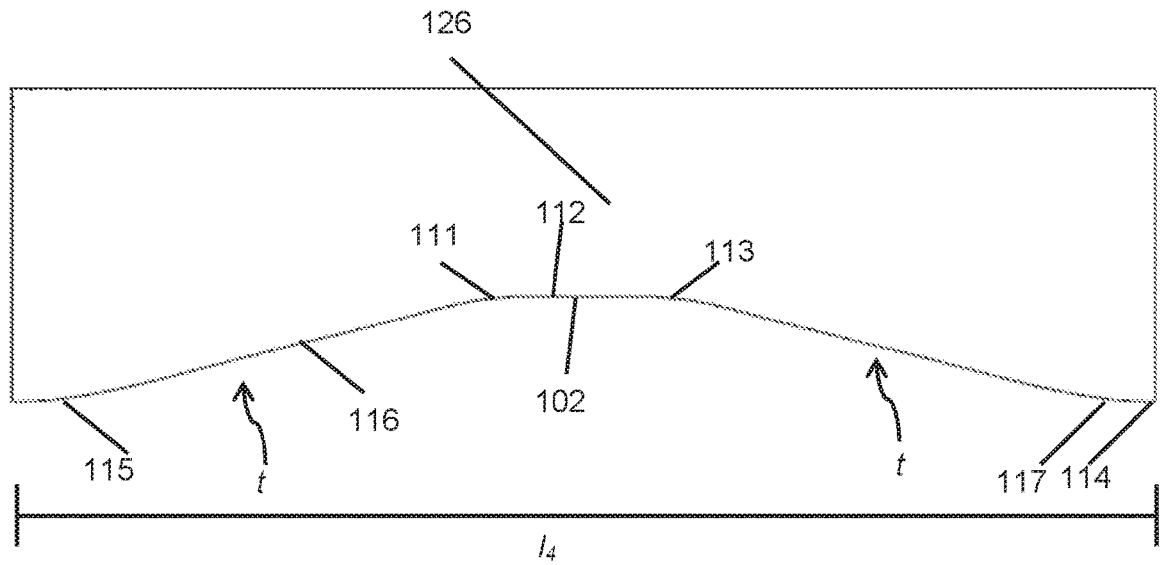
FIG. 8 is a side view of an embodiment of a head cover according to the present disclosure that has been separated at the posterior seam 22 of FIG. 11 and laid flat.
Figure 9:
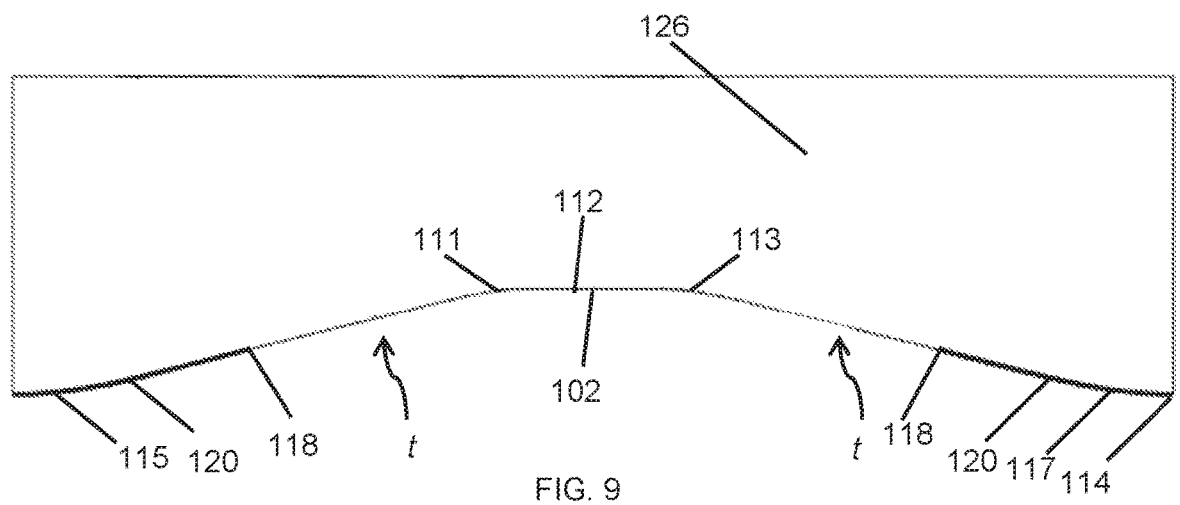
FIG. 9 is a side view of the head cover of FIG. 7 including elastic.

For instance, as generally shown in FIG. 2, the contoured portion t defines a bottom edge 116 that, beginning at a first end 111 and/or a second end 113 of the anterior portion bottom edge 112 and moving along the bottom edge 116 towards a first end 115 and/or second end 117 of the posterior portion bottom edge 114, has a negative slope that initially increases the height of the side portion 108 of the head cover 100 at a very gradual rate. When a point along the bottom edge 116 is reached, such as the point labeled m in FIG. 2, though it is noted that, point m may have no physical delineation and may simply refer to a point along bottom edge 116 such as a point of change in slope, signifying a change in the rate of increase in height of the side portion 108 of the head cover 100, the slope may become more negative, signifying a greater rate of increase in height of the side portion 108 along that portion of bottom edge 116. Similarly, continuing towards a first end 115 and/or second end 117 of the posterior portion bottom edge 114 from point m, the bottom edge 116 may reach a point, such as point 118, where the slope becomes less negative, and begins tapering towards a horizontal line, such as the slope of posterior portion bottom edge 114, signifying a lessening of the rate of increase in the height of the side portion 108 of the head cover 100. Of course, as shown in FIGS. 8 and 9, and as discussed above, the bottom edge 116 may also display a generally linear change in height between the anterior portion 102 and posterior portion 104.

Notwithstanding the contoured portion t, the head cover 100 may also include an elastic strip or elastic portion 120 along all or a portion of the head cover 100. For instance, referring again to FIG. 2, in one embodiment, the head cover 100 may include an elastic strip 120 only along a posterior portion 104. Particularly, FIG. 2 shows the elastic strip 120 beginning at point 118 and extending to at least the first end 115 of the posterior portion bottom edge 114. The elastic strip 120 may be integrated into the fabric, where a posterior portion 104 can be formed from a material having some elasticity, or the elastic strip 120 may be integrated into the head cover 100 by attaching the elastic strip 120 to the material that forms the portion of the head cover 100 where attachment of the elastic strip 120 is desired either before or after formation of the head cover 100. In such an embodiment where a separate elastic strip 120 is integrated into the head cover and is not a property of the material itself, such as by attaching the elastic strip 120 to the material that forms the head cover 100, the elastic strip 120 may be attached to the head cover 100 such that the elastic strip 120 is on an exterior surface of the head cover 100 or such that it is on an interior surface of the head cover 100 (e.g. between the head cover and a user when donned). However, in one embodiment, as will be discussed in greater detail below, elastic strip 120 may be located along the posterior portion bottom edge 114, and in a further embodiment, may be located on an interior portion of the posterior portion bottom edge 114. In such embodiments, the fit of the head cover 100 may be improved as previously discussed, such as by providing a soft elastic strip that is only attached to a portion of a head cover, minimizing pinching and marking from an elastic band (e.g., that encircles a user's head), but yet providing a comfortable and secure fit to a larger number of users.

Thus, in one embodiment, the elastic strip 120 may be attached at point 118 which may have a height $h_3$. The height $h_3$ may be a height slightly less than a height $h_2$ of the posterior portion 104 but slightly greater than a height h of an anterior portion 102 of the head cover 100. For instance, in one embodiment, the height $h_3$, of the side portion 108 of the head cover 100 where the elastic strip 120 may be attached to the bottom edge 116 of the side portion 108 may be from about 10 cm to about 20 cm, such as from about 11 cm to about 19 cm, such as from about 12 cm to about 18 cm, such as from about 13 cm to about 17 cm.

Additionally, in a relaxed state, the elastic strip 120 may have a length l, prior to incorporation into the head cover 100, of from about 7 cm to about 17 cm, such as from about 8 cm to about 16 cm, such as from about 9 cm to about 15 cm. Of course, referring to FIGS. 10 and 11, in one embodiment, the above ranges may relate to an elastic strip 120 that extends from a first end 115 of the posterior portion bottom edge 114 to posterior seam 122. Particularly, in such an embodiment, the elastic strip 120, may include two portions, one portion extending from the first end 115 of the posterior portion bottom edge 114 towards the posterior seam 122, and a second portion extending from the second end 117 of the posterior portion bottom edge 114 towards the posterior seam 122. Alternatively, the elastic strip 120 may be an elastic strip 120 that extends along the entire posterior section 104 from the first end 115 of the posterior portion bottom edge 114 to the second end 117 of the posterior portion bottom edge 114, or from one point marked by reference character 118 to a corresponding point 118 on an opposing side of the head cover 100. In such an instance, the elastic strip 120 (whether in two halves or one whole), prior to incorporation into the head cover 100, or prior to stretching/in a relaxed state, may have a length $l_2$ of from about 14 cm to about 34 cm, such as from about 16 cm to about 32 cm, such as from about 18 cm to about 30 cm.

Figure 11:
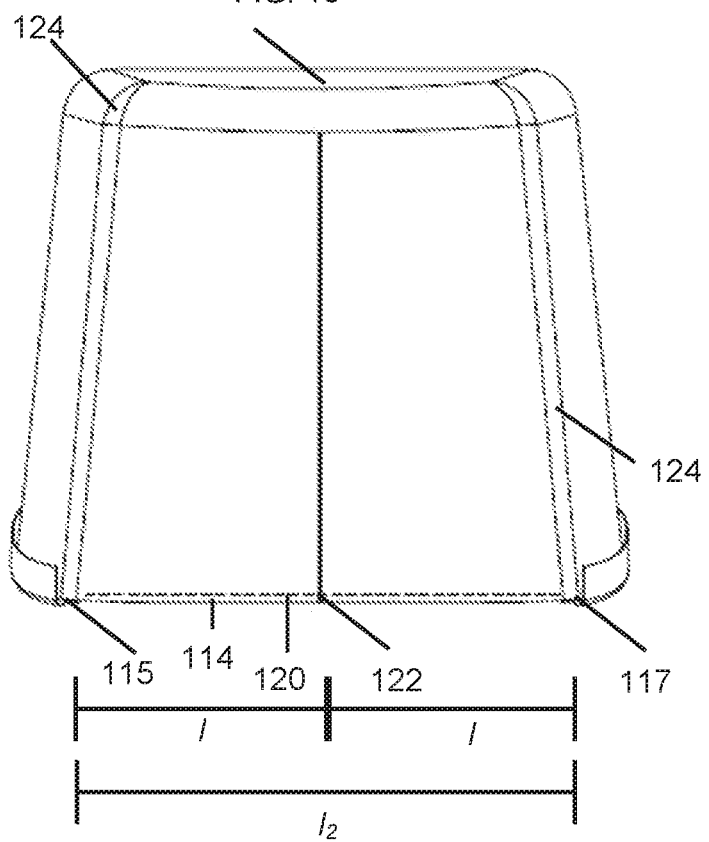
FIG. 11 is a back view of an embodiment of a head cover according to the present disclosure.

Nonetheless, whether the elastic strip 120 includes only a single portion having the originally disclosed relaxed length l, two portions each having a length l, or a single portion having a length $l_2$, the elastic strip 120, when stretched, may have a stretched length (not shown) of from about 1.5 to 3.5 times its relaxed length, such as from about 2 to 3 times the length (l or $l_2$) of the elastic strip 120 in the relaxed state (as more clearly shown in FIG. 11). In such an embodiment, the length l of the elastic strip 120, when stretched prior to incorporation into the head cover 100, and/or in a relaxed state prior to stretching, may be from about 21 cm to about 31 cm, such as from about 22 cm to about 30 cm, such as from about 23 cm to about 29 cm, such as from about 24 cm to about 28 cm.

Of course, while the above lengths may be provided for the elastic strip 120, the amount of stretching of the head cover 100 may also be dependent or limited by the stretch of the material forming the head cover 100 or any pleats or gussets 124 provided therein. In one embodiment, such as may be shown more clearly in FIGS. 6, 7, 10, and 11, the head cover 100 may have one or more gussets and/or pleats 124. Thus, in an embodiment such as shown in FIG. 2 when a head cover 100 is folded or separated in half along its medial line, such as a line extending through a center of a posterior portion 104 and a center of an anterior portion 102, the head cover 100 may have a length $l_3$ of from about 18 cm to about 28 cm, such as from about 19 cm to about 27 cm, such as from about 20 cm to about 26 cm, such as from about 21 cm to about 25 cm. In such an embodiment, when stretched along line A, (see FIG. 2), the head cover 100 may have a length (not shown) of from about 26 cm to about 36 cm, such as from about 27 cm to about 35 cm, such as from about 28 cm to about 34 cm, such as from about 29 cm to about 33 cm, or alternatively, may be stretched to a length of from about 1.25 to about 2 times the length of the unstretched or relaxed length, in this case $l_3$.

Figure 3:
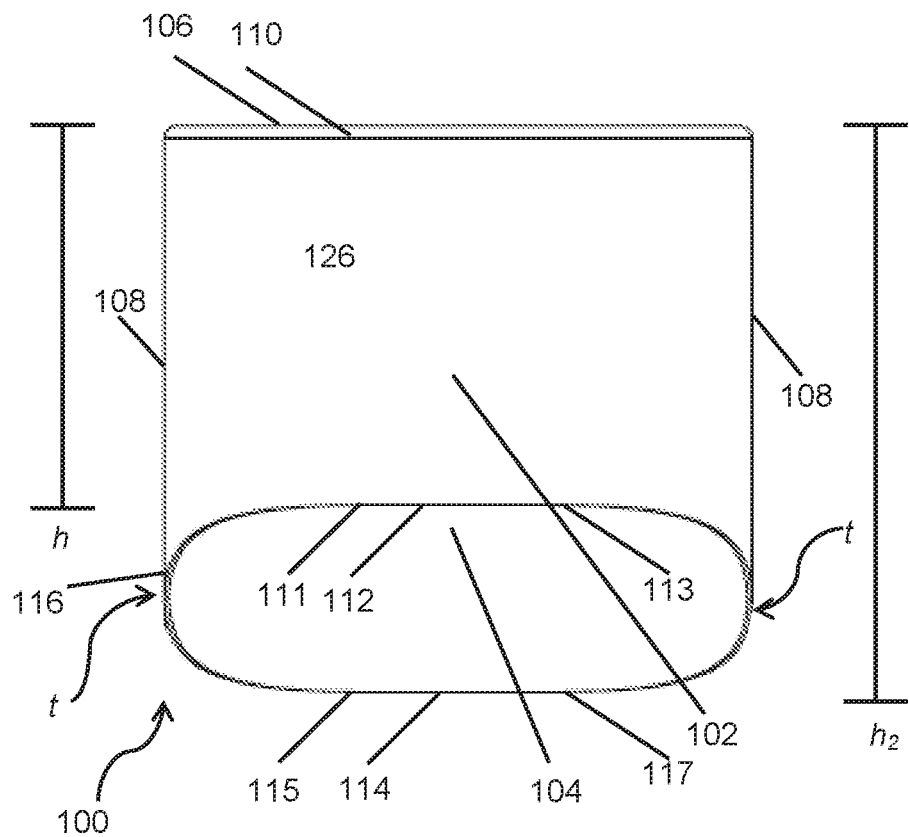
FIG. 3 is a front view of an embodiment of a head cover according to the present disclosure.

Next, FIG. 3 shows an embodiment of the present disclosure from a front view. The head cover 100 has a top surface 106 and side portion 108 (or portions 108 as previously discussed. The top surface 106 and side portion 108 can be joined together at a seam 110 that encircles the circumference (shown more clearly in FIG. 5) of the top surface 106. The head cover 100 has an anterior portion bottom edge 112, a first end 111 and a second end 113 of the anterior portion bottom edge 112, a posterior portion bottom edge 114, and a first end 115 and second end 117 of the posterior bottom edge 114. As previously discussed, in one embodiment, the side portion 108 is a portion of a continuous side panel 126. As such, there is no mark or delineation between the side portion 108 and the anterior portion 102 and/or posterior portion 104. Instead, a first end 111 and/or second end 113 of the anterior portion bottom edge 112, may mark the point where the contoured portion t and the anterior portion 102 meet, and/or may be located at an anterior portion 102 of the head cover 100 where the anterior portion bottom edge 112 is substantially horizontal or has no or negligible slope. Similarly, a first end 115 and/or second end 117 of the posterior portion bottom edge 114 may mark the point where the contoured portion t and the posterior portion 104 meet, and alternatively may be located at a posterior portion 104 of the head cover 100 where the posterior portion bottom edge 114 is substantially horizontal or has no or negligible slope.

Figure 4:
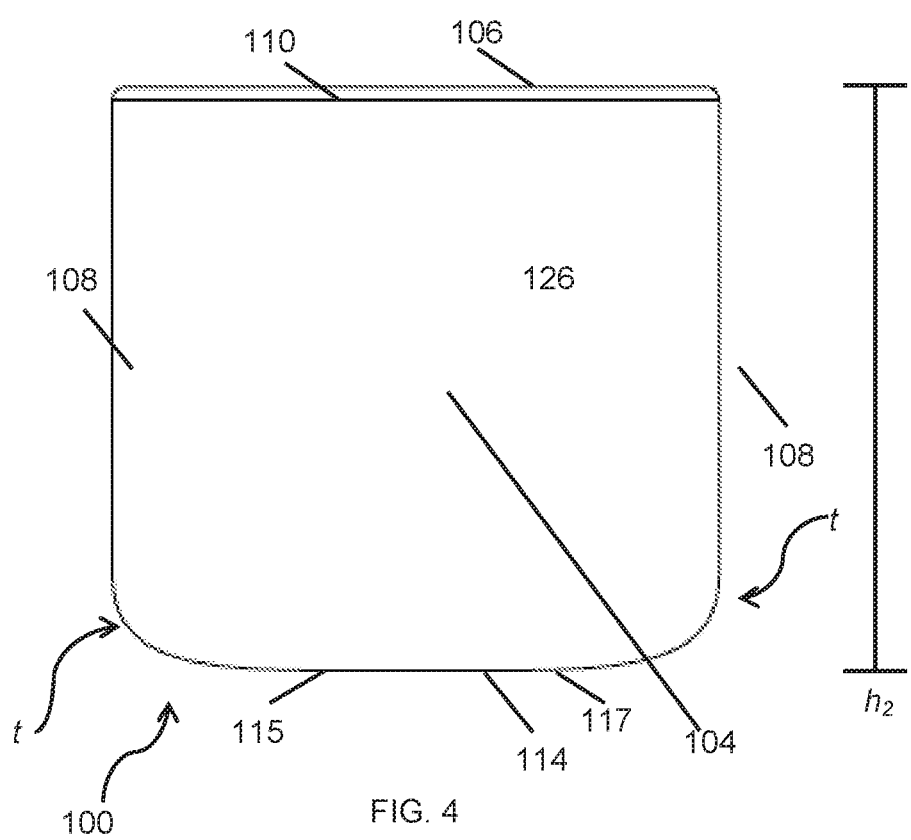
FIG. 4 is a back view of an embodiment of a head cover according to the present disclosure.

FIG. 4 shows an embodiment of the present disclosure from a rear view. The head cover 100 has a top surface 106 and side portion 108 (or portions 108 as previously discussed. The top surface 106 and side portion 108 can be joined together at a seam 110 that encircles the circumference (shown more clearly in FIG. 5) of the top surface 106. While the head cover 100 has an anterior portion bottom edge 112 and a posterior portion bottom edge 114, only the posterior portion bottom edge 114, include the first end 115 and second end 117 of the posterior portion bottom edge 114, is visible from the rear view. A portion of the contoured portion t is visible, extending to the left of the first end 115 of the posterior portion bottom edge 114 and to the right of the second end 117 of the posterior portion bottom edge 114. As discussed above, the side portion 108 may be a portion of a continuous side panel 126. As such, there is no mark or delineation between the side portion 108 and the posterior portion 104. Instead, the first end 115 and/or the second end 117 of the posterior portion bottom edge 114, may mark the point where the contoured portion t and the posterior portion 104 meet, and alternatively may be located at a posterior portion 104 of the head cover 100 where the posterior portion bottom edge 114 is substantially horizontal or has no or negligible slope.

Figure 5:
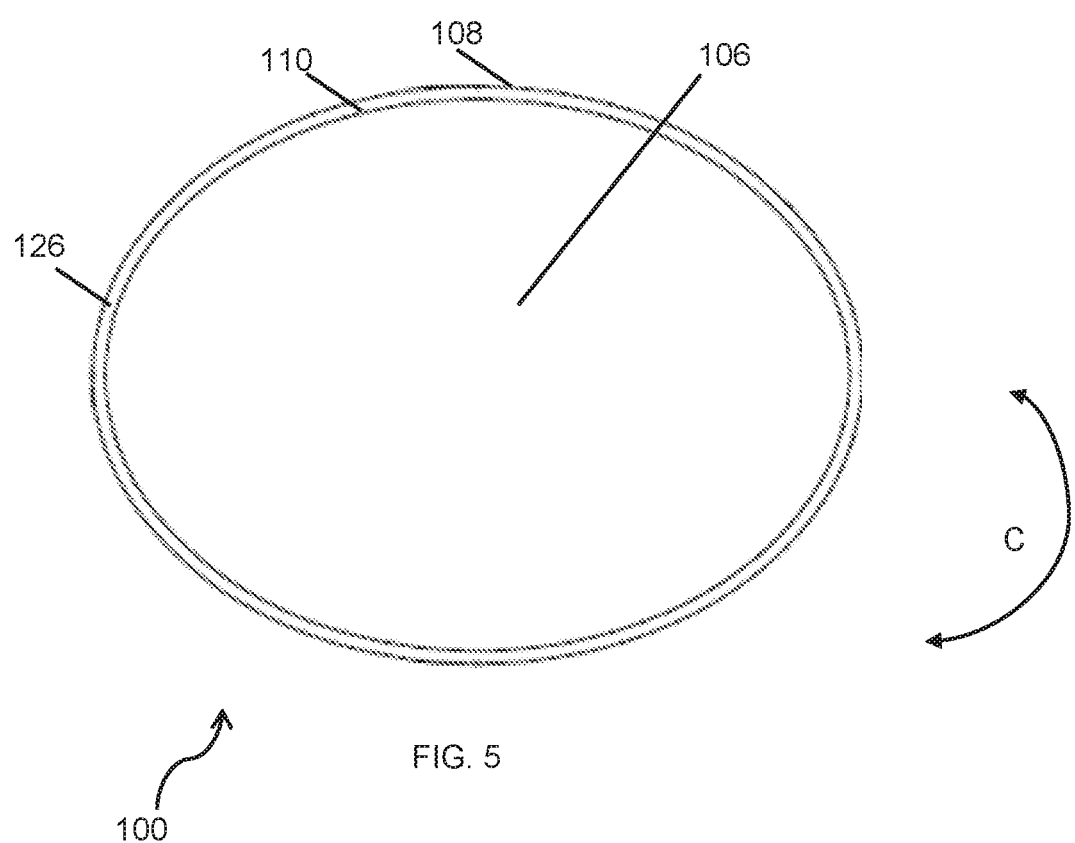
FIG. 5 is a top view of an embodiment of a head cover according to the present disclosure.
Figure 10:
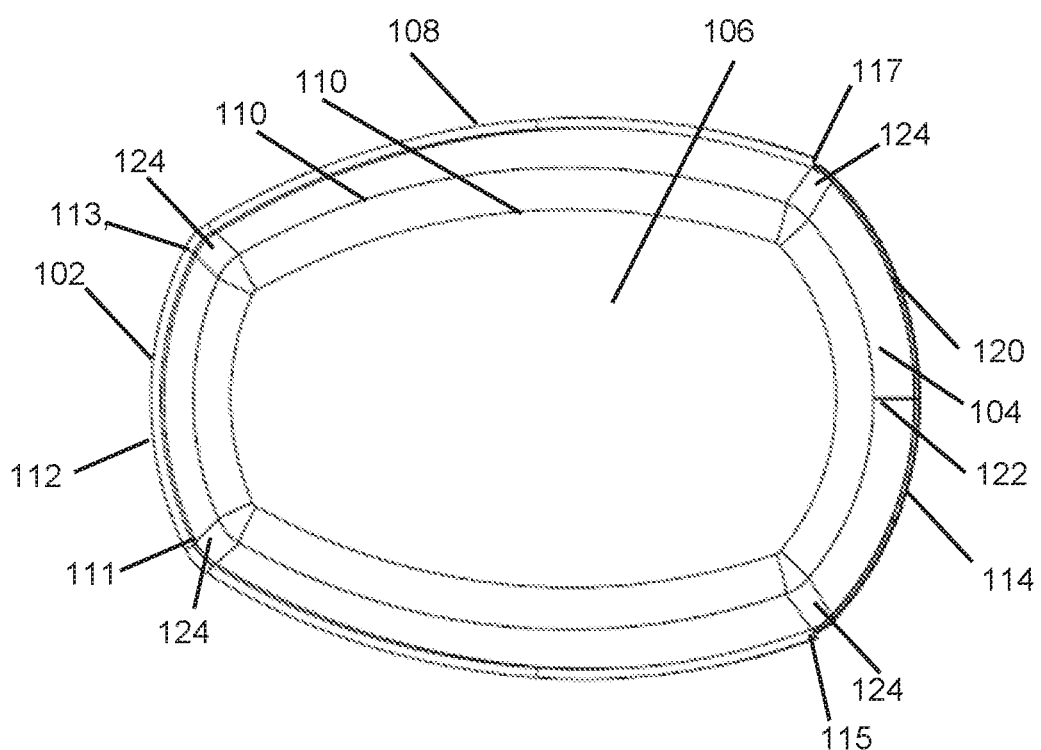
FIG. 10 is a bottom view of an embodiment of a head cover according to the present disclosure.

FIG. 5 shows an embodiment of the present disclosure from a top view. The head cover 100 has a top surface 106 and side portion 108 (or portions 108 as previously discussed. The top surface 106 and side portion 108 can be joined together at a seam 110 that encircles the circumference (shown more clearly in FIG. 5) of the top surface 106. As shown in the top view of FIG. 6, in one embodiment, the head cover 100 can have a circumference C measured around an exterior portion of the head cover, such as the circumference of side panel 126. Further, in this embodiment, the circumference C around the portion of side panel 126 adjacent to the top surface 106 or seam 110 may be the same or similar to a circumference of the side panel 126 adjacent to a bottom edge 116 (not shown in this Fig). However, as may be understood by one in the art and as generally shown in FIG. 10, the present disclosure also contemplates an embodiment wherein a portion adjacent to the top surface 106 may have a smaller circumference than a portion adjacent to a bottom edge 116.

For instance, in one embodiment, the circumference C of the head cover 100 may be from about 55 cm to about 76 cm, such as from about 57 cm to about 74 cm, such as from about 59 cm to about 72 cm, such as from about 61 cm to about 70 cm, such as from about 63 cm to about 68 cm. Alternatively, in an embodiment where the circumference may be different at a bottom edge 116 than adjacent a top surface 106, the larger of the two circumferences C may be based upon the above recited circumferences, and the smaller circumference may be from about 54 cm to about 75 cm, such as from about 56 cm to about 73 cm, such as from about 58 cm to about 71 cm, such as from about 60 cm to about 69 cm, such as from about 62 cm to about 67 cm.

Figure 6:
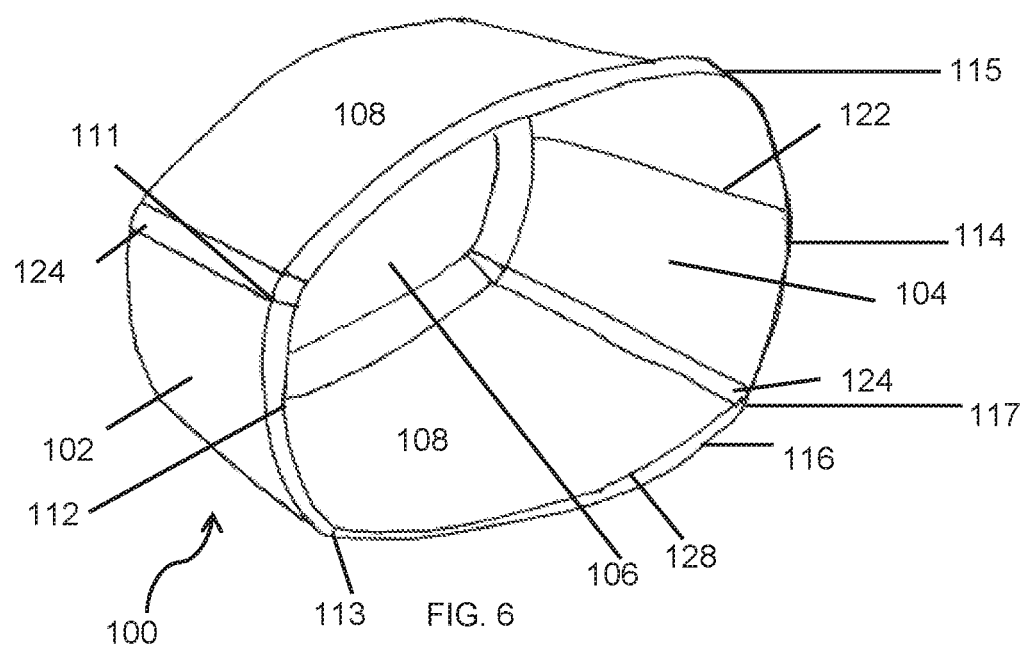
FIG. 6 is a bottom perspective view of an embodiment of a head cover according to the present disclosure.

Next, FIG. 6 is a bottom perspective view of an embodiment according to the present disclosure. As shown in FIG. 6, a head cover 100 of the present disclosure may have an anterior portion 102, a posterior portion 104, a top 106, a posterior seam 122, a bottom edge 116, and a bottom seam 128 that joins the bottom edge 116 to the side panel 126 (or side portions 108). In such an embodiment, the head cover 100 also has gussets or pleats 124. While a head cover 100 may be formed from a material naturally having stretch or give, in one embodiment, as discussed above, gussets or pleats 124 may be used to provide folded and contained excess material that allow the head cover 100 to stretch a predetermined amount in order to fit a large variety of users having different head shapes and sizes. The gussets or pleats 124 may also serve as a mark or delineation at one or both of the first end 111 and second end 113 of the anterior portion bottom edge 112, in this embodiment, between the side portion 108 and the anterior portion 102, or at one or both of the first end 115 and the second end 117 of the posterior portion bottom edge 114, between the side portion 108 and the posterior portion 104. Of course, in a further embodiment, no gussets or pleats are needed and instead, the material may be scrunched in all or a portion of the head cover 100, such as around the elastic strip 120, or the material may have sufficient natural stretch to enable to head cover 100 to stretch to a fully extended stretched position as discussed above.

Figure 7:
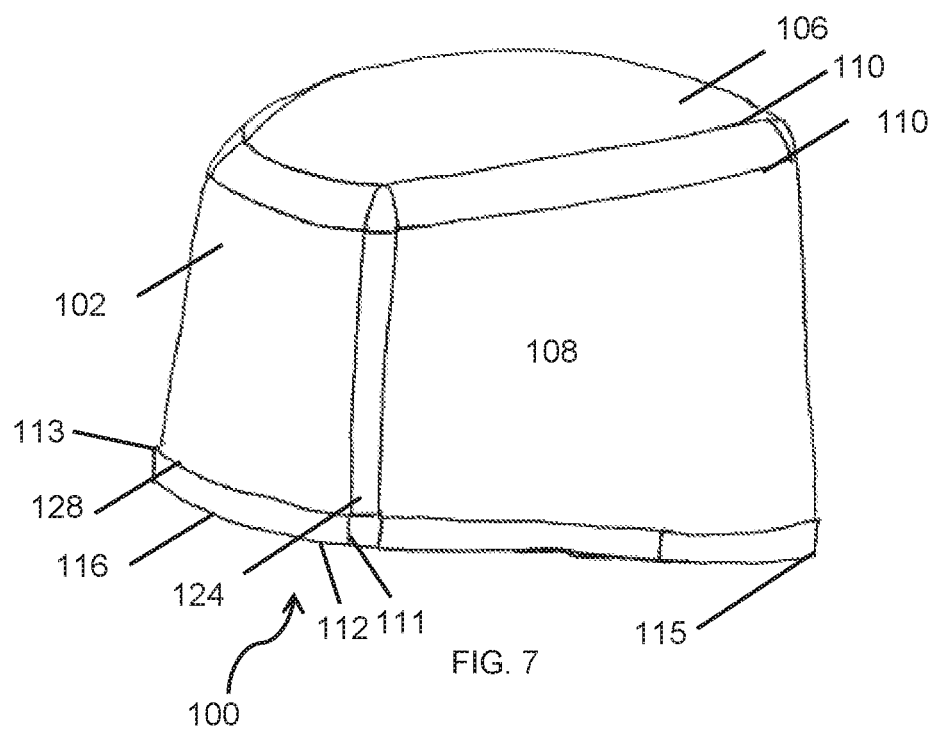
FIG. 7 is a side perspective view of an embodiment of a head cover according to the present disclosure.

FIG. 7 is a side perspective view of an embodiment according to the present disclosure. As shown in FIG. 6, a head cover 100 of the present disclosure may have an anterior portion 102, a top 106, a seam (or seams) 110, a bottom edge 116, and a bottom seam 128 that joins the bottom edge 116 to the side panel 126 (or side portion(s) 108). For instance, in one embodiment, one or more seams 110 may be used to join the top 106 to the side panel 126, for instance, to form a tapered seam or line from the side panel 126 to the top 106 or to better secure the top 106 to the side panel 126. In such an embodiment, the head cover 100 also has gussets or pleats 124. As discussed above, while a head cover 100 may be formed from a material naturally having stretch or give, in one embodiment, gussets or pleats 124 may be used to provide neatly folded and contained excess material that allows the head cover 100 to stretch in order to fit a large variety of users having different head shapes and sizes. The gussets or pleats 124 may also serve as a mark or delineation in this embodiment at the first end 111 of the anterior portion bottom edge 112, which may mark the point at which the side portion 108 meets the anterior portion 102, in this embodiment.

FIG. 8 shows a view of a head cover 100 according to the present disclosure that has been separated along the posterior seam 122. For instance, FIG. 8 may have a length $l_4$, which may have the same length in centimeters as either circumference C discussed above. Furthermore, FIG. 8 shows a single panel 126 forming the sides of the head cover 100 that has been, or will be, stitched together at posterior seam 122 or by using some other method of fastening at posterior seam 122, to form the head cover 100 that may encircle a head of a user. FIG. 8 further shows an embodiment wherein the contoured portion t has a generally linear contour. As discussed above, the contoured portion t may be linear or nonlinear, however, such a contour should be selected to be compatible with the above disclosed heights and also selected to have a contour portion t that connects the anterior portion bottom edge 112 and posterior portion bottom edge 114 of the head cover 100 while leaving the eyes of a user and a vision of a user, unencumbered and covering the ears, scalp, hair, and nape of a neck, of a user.

For instance, in one embodiment, the contoured portion t may begin around the first end 111 and/or second end 113 of the anterior portion bottom edge 112 and may have a fairly shallow negative slope so as to slowly increase the height of the head cover 100 from the anterior portion 102 to the posterior portion 104. In such a manner, the height of the contoured portion t near the anterior portion 102 and adjacent to a face and/or eyes of a user when in a donned configuration, may be near the same height as the anterior portion 102, or slightly greater. However, as the transition continues along bottom edge 116, the contoured portion may have a steeper negative slope, quickly increasing the height of the head cover 100 so as to cover the ears and desirably, earrings if necessary, of a user. The contoured portion t may then begin to taper back to a more gentle slope, approaching a slope of zero when nearing the first end 115 and/or second end 117 of the posterior portion bottom edge 114. In such a manner, the contoured portion t may define a bottom edge 116 having a change in a height of a side portion 108 of a head cover 100 in order to cover the ears, hair, scalp, and nape of a neck of a user, without covering the eyes or eyebrows of a user and/or inhibiting the vision or line of sight of a user.

Similarly, and as discussed above, elastic strip 120 may also be used to improve the fit of a head cover 100 of the present disclosure as shown in FIG. 9. Particularly, FIG. 9 shows an embodiment of FIG. 8 that further includes one or more elastic strips 120. The elastic strips 120 may be any material having elastic properties, such as elastics that may be generally used or known in the art, and may be used as a portion of the head cover 100 or may be an elastic strip 120 attached to or integrated with the head cover 100. Particularly, as discussed above, the elastic strip 120 may end, or be attached to the head cover 100, at a point 118. Such a point may be at a location along the contoured portion t on the bottom edge 116 of the side portion 108 where a height of the side portion 108 may be from about 1 cm to about 4.5 cm less than the height $h_2$ of the posterior portion 104, or, where side portion 108 may have a height equal to any of the heights discussed in regards to height $h_3$ above.

In one embodiment, point 118 may be located along the bottom edge 116 of the side portion 108, measured from the posterior seam 122 towards an anterior portion, at a distance of from about 7 cm to about 17 cm when in a relaxed state, from the posterior seam 122, such as from about 8 cm to about 16 cm from the posterior seam 122, such as from about 9 cm to about 15 cm, from the posterior seam 122 towards the anterior portion 102.

In such a manner, when at least one of the contoured portion t of the side portions 108 and the size and position of the elastic strip 120, or a combination thereof are selected according to the present disclosure, a head covering 100 that fits a large percentage of users and also meets AORN guidelines for coverage may be provided. Particularly, when a contoured portion t, first height h, second height $h_2$, elastic strip 120, or a combination thereof, are selected according to the present disclosure, a head cover 100 according to the present disclosure when donned by a user, may have an adequate or acceptable fit for at least about 60%, such as at least about 70%, such as at least about 75%, such as at least about 80%, such as at least about 85%, such as at least about 90% of users who don the head cover 100, where an adequate or acceptable fit may be defined as discussed above.

Additionally or alternatively, a head cover 100 according to the present disclosure, when donned by a user, may have adequate head and/or neck coverage for at least about 60%, such as for at least about 70%, such as for at least about 75%, such as for at least about 80%, such as for at least about 85%, such as for at least about 90% of users who don the head cover 100. Particularly, a head cover 100 according to the present disclosure was found to comply with AORN coverage guidelines on at least about 70%, such as at least about 75%, such as at least about 80%, such as at least about 85%, such as at least about 90% of users who don the head cover.

This written description uses examples to disclose the invention, and to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A personal protective equipment article, comprising:
    a wettable spunbond-meltblown-spunbond (SMS) fabric comprising:
    a spunbond-meltblown-spunbond laminate;
    a surfactant, wherein the surfactant comprises an anionic surfactant, a cationic surfactant, or combinations thereof;
    wherein the wettable spunbond-meltblown-spunbond (SMS) fabric exhibits a drying rate of from about 2.5 mL/hr to about 4 mL/hr;
    wherein at least a portion of the article is configured to be in contact with skin of a user in a donned position.

2. The personal protective equipment article of claim 1, wherein the wettable spunbond-meltblown-spunbond (SMS) fabric has a weight, and is configured to absorb an amount of liquid that is from about 1.5 times to about 4.5 times the weight of the wettable spunbond-meltblown-spunbond (SMS) fabric.

3. The personal protective equipment article of claim 1, wherein the wettable spunbond-meltblown-spunbond (SMS) fabric is configured to absorb the liquid from the skin of a user.

4. The personal protective equipment article of claim 1, wherein the spunbond-meltblown-spunbond laminate contains at least about three layers, and the surfactant is contained in or on at least two layers of the spunbond-meltblown-spunbond laminate.

5. The personal protective equipment article of claim 1, wherein the wettable spunbond-meltblown-spunbond (SMS) fabric has a permeability to air of from about 40 CFM to about 62 CFM.

6. The personal protective equipment article of claim 1, wherein the wettable spunbond-meltblown-spunbond (SMS) fabric is configured to absorb an amount of liquid of from about 1.25 grams to about 7.25 grams per gram of the wettable spunbond-meltblown-spunbond (SMS) fabric.

7. The personal protective equipment article of claim 1, wherein the article is a head cover, and wherein at least a portion of the head cover comprises the wettable spunbond-meltblown-spunbond (SMS) fabric, and wherein at least a portion of the head cover comprises a spunbond fabric.

8. A method of forming a personal protective equipment article, comprising,
    saturating at least one side of a spunbond-meltblown-spunbond (SMS) fabric with a surfactant, wherein the surfactant is a cationic surfactant, anionic surfactant, or combinations thereof;
    drying the surfactant saturated spunbond-meltblown-spunbond (SMS) fabric;
    processing the surfactant saturated spunbond-meltblown-spunbond (SMS) fabric; and
    forming a wettable spunbond-meltblown-spunbond (SMS) fabric,
    wherein the wettable spunbond-meltblown-spunbond (SMS) fabric exhibits a drying rate of from about 2.5 mL/hr to about 4 mL/hr.

9. The method of claim 8, wherein the processing step includes at least one antistatic treatment.

* * * * *